United States Patent [19]
Dehnert

[11] 3,981,873
[45] Sept. 21, 1976

[54] SULFUR CONTAINING DYES OF THE QUINONAPHTHALONE SERIES

[75] Inventor: Johannes Dehnert, Ludwigshafen, Germany

[73] Assignee: BASF Aktiengesellschaft, Ludwigshafen, Rhine, Germany

[22] Filed: Nov. 7, 1973

[21] Appl. No.: 413,663

[30] Foreign Application Priority Data
Nov. 9, 1972   Germany............................ 2254757

[52] U.S. Cl......................... 260/289 H; 260/283 S; 8/1 D; 8/179
[51] Int. Cl.².......................................... C09B 25/00
[58] Field of Search ................... 260/283 S, 289 QP

[56] References Cited
UNITED STATES PATENTS

| | | | |
|---|---|---|---|
| 3,399,028 | 8/1968 | Illy .................................. | 260/283 R |
| 3,655,672 | 4/1972 | Spietschka et al............ | 260/289 QP |
| 3,788,810 | 1/1974 | Kalz............................... | 260/289 QP |

*Primary Examiner*—Nicholas S. Rizzo
*Assistant Examiner*—Mary C. Vaughn
*Attorney, Agent, or Firm*—Johnston, Keil, Thompson & Shurtleff

[57] ABSTRACT

Sulfur-containing quinophthalone dyes obtainable by reaction of tetrahaloquinopthalone compounds with mercaptans with partial or complete replacement of halogen. The dyes are yellow and eminently suitable for coloring polyesters and resins and particularly polystyrene.

6 Claims, No Drawings

SULFUR CONTAINING DYES OF THE QUINONAPHTHALONE SERIES

The invention relates to dyes of formula (I):

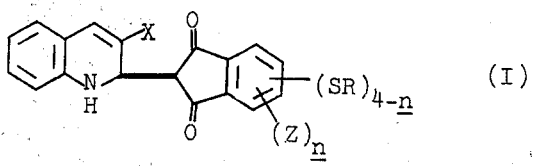 (I)

in which
Z is chloro or bromo;
X is hydrogen or hydroxy; and
n is zero, 1, 2 or 3 and
$(SR)_{4-n}$ represents $4-n$ radicals which may be separate, (R denoting H or an unsubstituted or substituted alkyl, cycloalkyl, aralkyl or aryl radical) or any adjacent pair of which may be combined into a radical —S—R′—S— where R′ represents a divalent substituted or unsubstituted hydrocarbon radical (whereby one or two six-membered rings each containing 2 sulphur atoms is formed)).

Example of radicals R (in addition to hydrogen) are: alkyl of one to 12 carbon atoms and preferably of two to six carbon atoms which may bear hydroxy, alkoxy, phenoxy, carboxy, carbalkoxy, amino, N-substituted amino, acyloxy, akanoyl or cyano as substituents, cycloalkyl of five to seven ring members, aralkyl of seven or eight carbon atoms or aryl which may bear alkyl, alkoxy, halogen, carboxyl, carbalkoxy or hydroxy as substituents.

Example of individual radicals R are:
hydrogen, methyl, ethyl, n-propyl, isopropyl, n-butyl-isobutyl, n-hexyl, 2-ethylhexyl, dodecyl, cyclohexyl, benzyl, 2-hydroxyethyl, 2-aminoethyl, 2-dimethylaminoethyl, 2-cyanoethyl, 2-hydroxypropyl, 2,3-dihydroxypropyl, phenyl, 4-methylphenyl, 4-methoxyphenyl, 4-chlorophenyl, 2,5-dichlorophenyl; 2,4,5-trichlorophenyl, and 2,3,4,5,6-pentachlorophenyl and of R′ 3,4-toluylene and dimethylene.

Particular importance attaches to dyes of the formula (Ia):

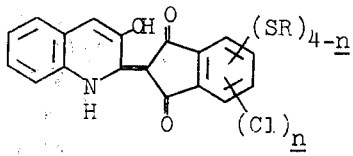

in which n have the above meanings and R is hydrogen, 2-hydroxyethyl, 2-hydroxypropyl, 2,3-dihydroxypropyl, n-butyl, n-dodecyl, cyclohexyl, benzyl, phenyl, 4-tolyl, 4-methoxyphenyl, 4-chlorophenyl, 2,5-dichlorophenyl, 2,4,5-trichlorophenyl, 2,3,4,5,6-pentachlorophenyl, carboxymethyl, carbomethoxymethyl, 2-carboxyethyl, 2-carbomethoxyethyl or 3,4-toluylene and the radicals when n is less than 3 may be identical or different.

Preferred radicals R are derived from hydroxyalkyl-mercaptans and thiophenols.

Compounds of formula (I) may be prepared by reacting a compound of formula (II):

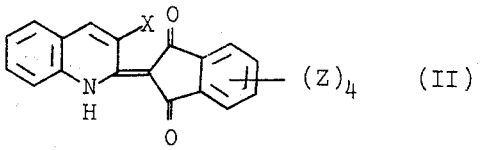 (II)

with a mercapto compound of formula (III):

R—(SH)$_m$ (III)

in which m is 1 or 2 or a salt thereof.

Compounds of formula (III) (which may also be used in the form of their salts, preferably water-soluble salts, for example the alkali metal salts) include for example sodium sulfide, sodium hydrogen sulfide, 2-hydroxyethylmercaptan, 2-hydroxypropylmercaptan, n-butylmercaptan, n-dodecylmercaptan, cyclohexylmercaptan, benzylmercaptan, thiophenol, 4-methylthiophenol, 4-methoxythiophenol, 4-chlorothiophenol, 2,5-dichlorothiophenol, 2,4,5-trichlorothiophenol, 2,3,4,5,6-pentachlorothiophenol, toluene-3,4-dithiol, ethane-1,2-dithiol, mercaptoacetic acid, methyl, ethyl and butyl esters of mercaptoacetic acid, 2-mercaptopropionic acid and its esters.

Reaction of the compound of formula (II) with that of formula (III) is conveniently carried out at elevated temperature, for example from 30° to 220°C and preferably from 80° to 200°C with or without the use of a diluent and an additive which binds acid. Examples of these are dimethylformamide, N-methylpyrrolidone, dimethylsulfoxide, tetramethylurea or butyrolactone, if desired mixed with each other or with water.

Examples of acid-binding agents are: potassium carbonate, calcium carbonate, sodium acetate, sodium methylate, magnesium oxide, amines such as triethylamine, tri-n-butylamine, tri-isopropanolamine and the solvents dimethylformamide and N-methylpyrrolidone.

The new dyes are yellow to orange and depending on the substituents are suitable as disperse dyes for textiles of cellulose esters, polyamides, acrylonitrile polymers and particularly polyesters, for coloring plastics, for example polyvinyl chloride and particularly polystyrene, as pigments or as sulfur dyes. Some of them may similarly be ued for coloring solvents and for transfer printing.

Some of the dyes may be used with carriers in spite of very high thermal fastness properties. Colorations having excellent fastness properties and particularly light fastness properties are obtained.

The following Examples illustrate the invention.

Parts and percentages are by weight unless otherwise stated.

EXAMPLE 1

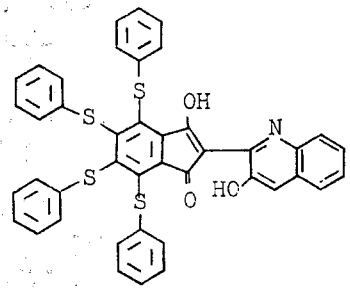

A mixture of 43 parts of 2- 3′-hydroxyquinolyl-(2′)-4,5,6,7-tetrachloroindandione-(1,3) (compound (A)). 55 parts of thiophenol, 80 parts of potassium carbonate and 400 parts by volume of N-methylpyrrolidone is stirred at 150°C unitl complete reaction has taken place, this being determined by a thin layer chromatogram. The reaction product is precipitated by adding 1000 parts by volume of alcohol and 50 parts by volume of concentrated hydrochloric acid, suction filtered and washed with alcohol and then with water. After drying at 90°C a yellow powder is obtained which colors polystyrene outstandingly lightfast reddish yellow hues.

EXAMPLE 2

The procedure described in Example 1 is repeated but the potassium carbonate is replaced by 50 parts of calcium carbonate. The same compound as in Example 1 is obtained.

EXAMPLE 3

96 parts of triisopropanolamine is used instead of potassium carbonate in Example 1. The same reaction product as in Example 1 is obtained.

EXAMPLE 4

A mixture of 17 parts of compound (A), 22 parts of thiophenol and 100 parts by volume of dimethylformamide is heated for 5 hours under reflux until complete reaction is determined by thin layer chromatogram. The reaction product is suction filtered at ambient temperature, washed with dimethylformamide and then with alcohol and dried at 90°C. The same dye as in Example 1 is obtained.

By adopting the procedure of the foregoing Examples but replacing the thiophenol by an equivalent amount of one of the following compounds, yellow dyes of analogous constitution are obtained having similar tinctorial properties:

| Example | SH compound |
|---|---|
| 5 | 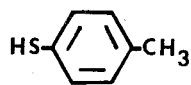 |
| 6 | 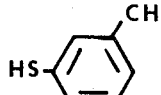 |
| 7 | 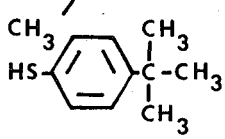 |
| 8 | 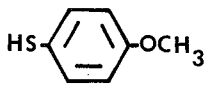 |
| 9 |  |
| 10 | 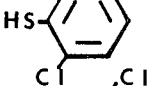 |
| 11 | 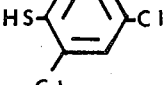 |
| 12 | 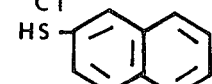 |
| 13 | 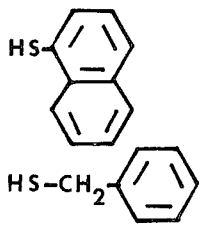 |
| 14 | HS-CH$_2$-⟨phenyl⟩ |

EXAMPLE 15

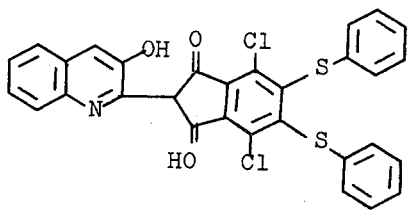

17 parts of compound A in 160 parts by volume of N-methylpyrrolidone is stirred for 5 hours at 160°C with 22 parts of thiophenol. 400 parts by volume of alcohol is added and the dye is suction filtered when cold, washed with alcohol and water and dried. The yellow powder gives colorations of outstanding light fastness in polystyrene.

Reaction products of similar constitution are obtained in the same way with the following SH compounds:

| Example | SH compound |
|---|---|
| 16 |  |
| 17 |  |
| 18 | 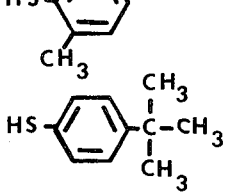 |
| 19 |  |
| 20 |  |
| 21 | 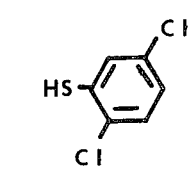 |

| Example | SH compound |
|---|---|
| 22 | 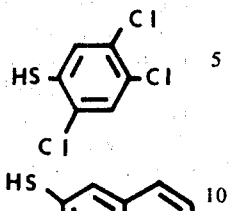 |
| 23 |  |

EXAMPLE 24

A mixture of 13 parts of compound (A), 3.5 parts of thiophenol, 4 parts of thio-p-cresol, 5 parts of 2,5-dichlorothiophenol and 4 parts of p-methoxythiophenol, 27 parts of triisopropanolamine and 50 parts by volume of N-methylpyrrolidone is stirred for 6 hours at 150°C and then introduced into 1000 parts by volume of alcohol. The dye mixture thus precipitated is suction filtered, washed with water and alcohol and dried at 70°C. The yellowish brown powder thus obtained colors polystyrene fast reddish yellow hues.

EXAMPLE 25

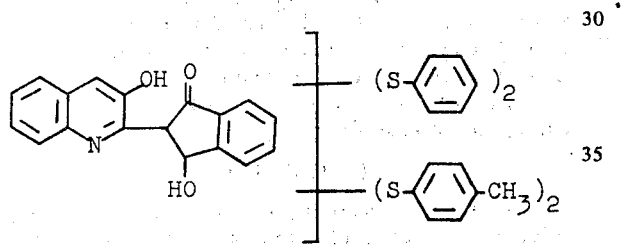

17 parts of compound (A) together with 11 parts of thiophenol and 13 parts of thio-p-cresol is stirred in 1000 parts by volume of dimethylformamide for 6 hours at 150°C. The reaction product is isolated at room temperature and dried. It is a yellow powder which colors thermoplastics reddish yellow hues of outstanding fastness properties.

EXAMPLE 26

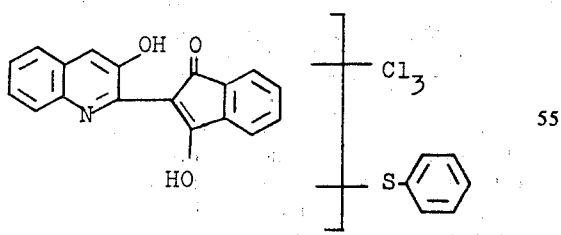

A mixture of 43 parts of compound (A), 12 parts of thiophenol, 30 parts of triisopropanolamine and 100 parts by volume of N-methylpyrrolidone is stirred for 5 hours at 150°C. After cooling the reaction product is suction filtered, washed with dimethylformamide and then with alcohol and dried. The new compound which is a yellow powder colors polystyrene yellow hues of outstanding fastness to light.

EXAMPLE 27

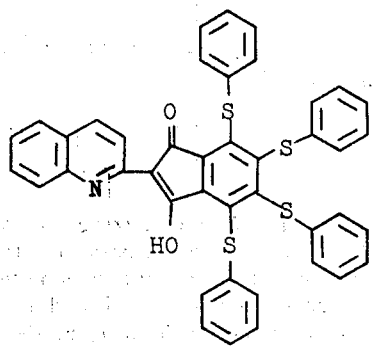

17 parts of 2-[quinolyl-(2')]-4,5,6,7-tetrachloroindandione-(1,3) is stirred with 22 parts of thiophenol in 100 parts by volume of dimethylformamide for 6 hours under refluxing conditions. The product is isolated after cooling and dried. It is a yellow powder and gives greenish yellow colorations in polystyrene.

EXAMPLE 28

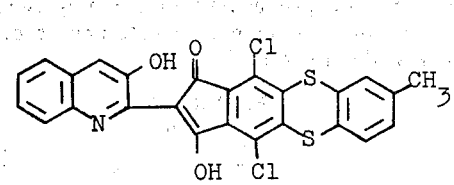

5 parts by volume of toluene-(3,4)-dithiol is added all at once at 120°C to a mixture of 15 parts of compound (A) and 150 parts of N-methylpyrrolidone and then the whole is stirred for 3 hours at 150°C. The reaction product is suction filtered at 120°C, washed with dimethylformamide and then with hot alcohol and dried. The powder obtained gives fast yellow hues when used for coloring polystyrene.

EXAMPLE 29

15.5 parts of the dye from the preceding Example is heated with 11 parts of thiophenol and 23 parts of triisopropanolamine for 3 hours under reflux (200°C). The reaction product is suction filtered when cold, washed with alcohol and hot water and dried. The new compound colors polystyrene fast yellow hues. It has the probable formula:

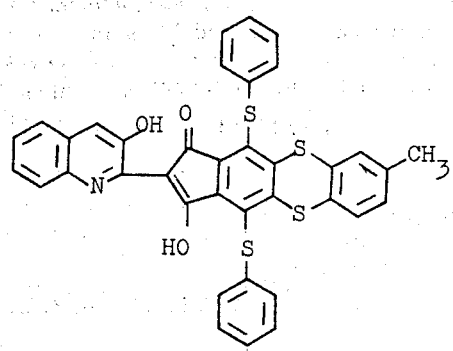

EXAMPLE 30

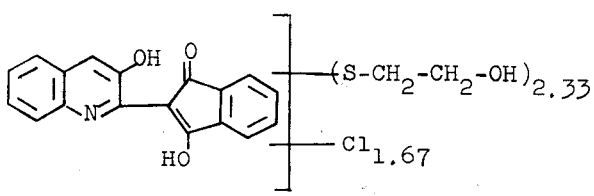

17 parts of compound (A) is stirred for 4 hours at 150°C with 8 parts of mercaptoethanol, 16 parts of calcium carbonate and 150 parts of N-methylpyrrolidone. The reaction mixture is allowed to flow into dilute hydrochloric acid made up from 1500 parts of water and 50 parts by volume of concentrated hydrochloric acid. The whole is stirred for 3 hours and then suction filtered, washed with water and dried at 70°C. A yellow powder is obtained which dissolves in dimethylformamide with a yellow color. It gives on textile polyester material full yellow colorations having excellent fastness properties by the HT method and also in carrier dyeing.

EXAMPLE 31

A dye mixture of the same composition and having the same tinctorial properties is obtained by using 13.5 parts of anhydrous sodium carbonate and proceeding otherwise as described in Example 30.

EXAMPLE 32

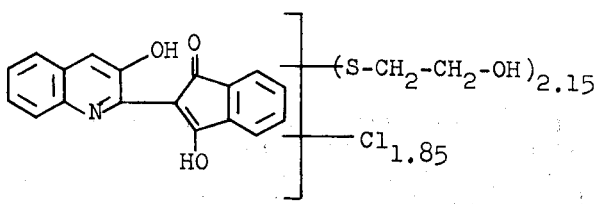

17 parts of compound (A) is stirred with 16 parts of mercaptoethanol in 100 parts by volume of dimethylformamide for 14 hours under refluxing conditions (150°C). 1500 parts of water at 10°C is slowly introduced with vigorous stirring and the product is suction filtered, washed with water and dried at 70°C. A yellow powder is obtained which when finely dispersed in water by means of a conventional dispersing agent colors polyester cloth yellow hues of outstanding fastness properties.

EXAMPLE 33

A dye mixture of similar composition and similar trinctorial properties is obtained by stirring 17 parts of compound (A) with 6.5 parts of mercaptoethanol, 38 parts of triisopropanolamine and 200 parts by volume of N-methylpyrrolidone for 3 hours at 160°C and then effecting precipitation with 1000 parts of water.

EXAMPLE 34

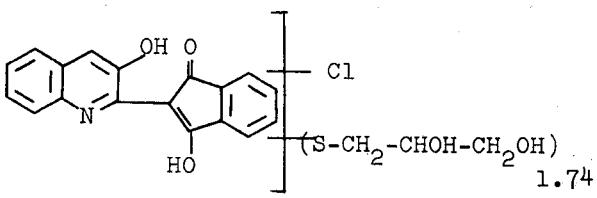

17 parts of compound (A) is stirred for 4 hours at 150°C with 11 parts of 3-mercaptopropanediol-(1,2) and 10 parts of calcium carbonate in 150 parts of N-methylpyrrolidone. The reaction mixture is allowed to flow into a dilute hydrochloric acid consisting of 1500 parts of water and 50 parts by volume of 10N hydrochloric acid. After stirring for 3 hours the precipitated product is suction filtered, washed with water and dried. The dye mixture, which is a yellow powder, colors polyester filament yellow hues having outstanding fastness properties.

EXAMPLE 35

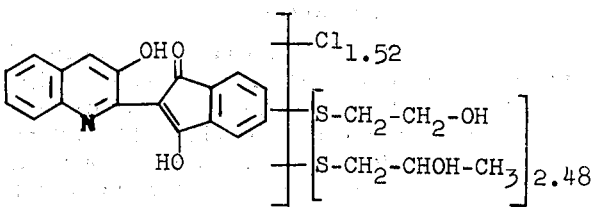

A mixture of 21 parts of compound (A), 9.5 parts of mercaptoethanol, 5 parts of mercaptopropanol, 36 parts of triisopropanolamine and 100 parts of N-methylpyrrolidone is stirred for 6 hours under reflux at 190°C. For isolation the whole is stirred into 1000 parts by volume of methanol, and the precipitated reaction product is suction filtered, washed with methanol and dried. The powder which dissolves in dimethylformamide with a yellow color gives yellow colorations of outstanding fastness to light and dry-heat pleating and setting on polyester fibers.

EXAMPLE 36

23 parts of the reaction product obtained according to Example 15 are reacted with 10 parts of 2-mercaptoethanol in 50 parts of volume of N-methylpyrrolidone with an addition of 32 parts of triisopropanolamine by heating for 8 hours at 180°C while stirring. The whole is dripped into a mixture of 1500 parts of water, 1500 parts of ice and 40 parts of 10N hydrochloric acid while stirring well. The dye thus precipitated is suction filtered, washed with water and dried. The quinophthalone derivative obtained as a yellow powder colors polyesters yellow hues having outstanding fastness properties. It probably has the formula:

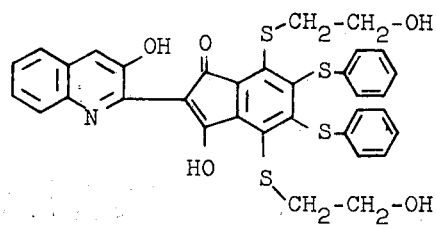

EXAMPLE 37

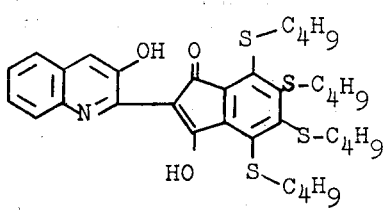

A mixture of 17 parts of compound (A), 18 parts of n-butylmercaptan, 20 parts of calciumcarbonate and 100 parts by volume of N-methylpyrrolidone is stirred under reflux for 5 hours and the whole is then stirred into a mixture of 1000 parts of water, 500 parts of ice and 50 parts of 10N hydrochloric acid. After stirring for 3 hours the product is suction filtered, washed with water and dried at 70°C. The yellow powder gives fast yellow colorations on polyester fibers by the high temperature method. It is also suitable for coloring polystyrene, surface coatings and waxes.

EXAMPLE 38

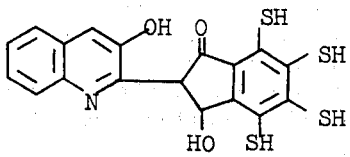

21 parts of compound (A) is stirred with 100 parts by volume of N-methylpyrrolidone and 100 parts of a 20% aqueous solution of sodium hydrogen sulfide at 110°C until complete reaction has been established by thin layer chromatography. The whole is dissolved in 1500 parts of hot water, filtered while hot and the reaction product is precipitated by dripping in 100 parts by volume of 30% acetic acid at 60°C. After suction filtration, washing with water and drying at 70°C, a yellowish brown powder is obtained which dissolves in dimethylformamide or at alkaline pH in water with a reddish brown color. Dyed onto cotton as a sulfur dye full yellow hues are obtained therewith.

EXAMPLE 39

12 parts of 2-[(3'-hydroxyquinolyl-(2')]-4,5,6,7-tetrabromoindandione-(1,3) is heated with 11 parts of thiophenol in 50 parts by volume of dimethylformamide for 8 hours while stirring under reflux. After cooling the whole is diluted with 50 parts by volume of dimethylformamide, suction filtered and washed with 50 parts by volume of dimethylformamide and 50 parts by volume of methanol. The dried reaction product is identical with that obtained according to Examples 1 to 4.

EXAMPLE 40

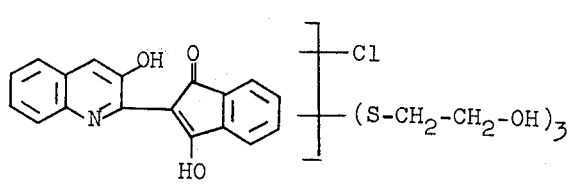

In the procedure of Example 30 16 pats of mercaptoethanol is used instead of 8 parts and 20 parts of calcium carbonate is used instead of 16 parts. After isolation and drying a dye mixture is obtained of the composition given. Yellow hues of high fastness to light and dry-heat pleating and setting are obtained on polyester filament.

EXAMPLE 41

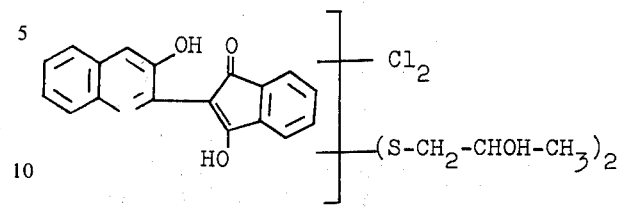

A mixture of 17 parts of compound (A), 9.5 parts of 1-mercaptopropanol-(2), 5 parts of calcium carbonate and 150 parts by volume of N-methylpyrrolidone is stirred for 4 hours at 150°C, poured into 1500 parts of water and 25 parts by volume of 10N hydrochloric acid, washed with water and dried. A yellow dye powder is obtained with which yellow coloration of good depth of color and fastness to light and dry-heat pleating and setting are obtained on polyester cloth by the HT method and also by the carrier method.

EXAMPLE 42

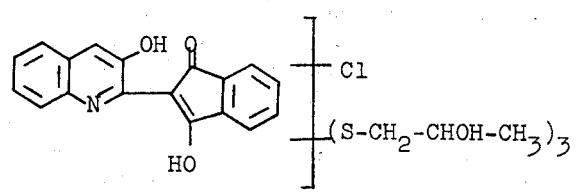

In the procedure according to Example 41 19 parts of 1-mercaptopropanol-(2) is used instead of 9.5 parts and 10 parts of calcium carbonate is used instead of 5 parts, the other conditions being unchanged. The mixture of isomers of the above composition is obtained. It is a yellow powder which colors polyester fibers yellow hues having outstanding fastness properties.

EXAMPLE 43

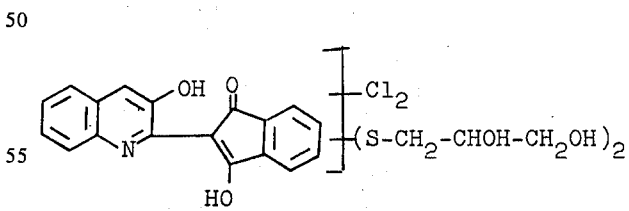

A mixture of 17 parts of compound (A), 11 parts of 1-mercaptopropanediol-(2,3), 10 parts of calcium carbonate and 150 parts of N-methylpyrrolidone is stirred for 4 hours at 160°C, then introduced into 1500 parts of water and 50 parts of 10N hydrochloric acid and the whole is stirred for 3 hours at ambient temperature. After suction filtration, washing with water and drying a yellow powder is obtained which colors polyester cloth yellow hues of high fastness.

EXAMPLE 44

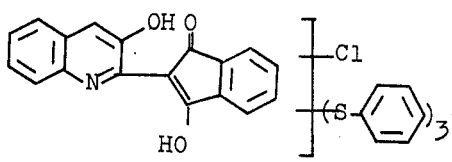

A mixture of 17 parts of compound (A), 13.5 parts of thiophenol, 13.5 parts of calcium carbonate and 150 parts of N-methylpyrrolidone is stirred for 4 hours at 150°C, poured into a dilute hydrochloric acid prepared from 1500 parts of water and 35 parts of 10N hydrochloric acid and stirred at room temperature for 2 hours. The reaction product is suction filtered, washed with water and dried. It is a yellow powder which colors rigid PVC or polystyrene fast reddish yellow hues.

Equivalent amounts of the following SH compounds are used instead of thiophenol; dyes having similar properties are obtained.

| Example | SH compound |
|---|---|
| 45 | HS–C₆H₄–CH₃ |
| 46 | HS–C₆H₃(CH₃)₂ |
| 47 | HS–C₆H₄–C(CH₃)₃ |
| 48 | HS–C₆H₄–OCH₃ |
| 49 | HS–C₆H₄–Cl |
| 50 | HS–C₆H₃Cl₂ |
| 51 | HS–C₆H₂Cl₃ |
| 52 | HS–CH₂–C₆H₅ |
| 53 | HS–C₆H₁₁ |
| 54 | HS–naphthyl |

EXAMPLE 55

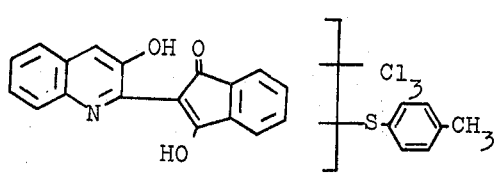

17 parts of compound (A) is stirred for 4 hours at 150°C with 5 parts of thio-p-cresol, 5 parts of calcium carbonate and 150 parts of N-methylpyrrolidone. The reaction mixture is introduced into 1500 parts of water to which 15 parts by volume of 10N hydrochloric acid has been added and the whole is stirred for 3 hours. The isolated and dried dye which is a yellow powder colors polystyrene and rigid PVC yellow hues of outstanding fastness properties.

When equivalent amounts of the following SH compounds are used instead of thiophenol dyes of similar qualities are obtained.

| Example | SH compound |
|---|---|
| 56 | HS–C₆H₃(CH₃)₂ |
| 57 | HS–C₆H₄–C(CH₃)₃ |
| 58 | HS–naphthyl |
| 59 | HS–C₆H₄–OCH₃ |
| 60 | HS–C₆H₄–Cl |
| 61 | HS–C₆H₃Cl₂ |
| 62 | HS–C₆H₂Cl₃ |
| 63 | HS–CH₂–C₆H₅ |
| 64 | HS–C₆H₁₁ |
| 65 | HS–C₄H₉ |

EXAMPLE 66

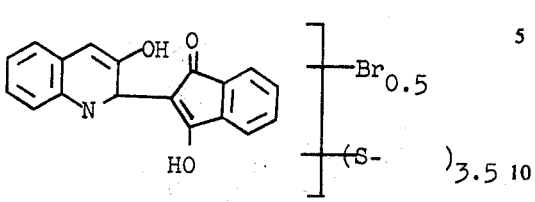

A mixture of 12 parts of 2-(3'-hydroxyquinolyl-(2')-4,5,6,7-tetrabromoindandione-(1,3) (compound (B)), 11 parts of thiophenol and 50 parts by volume of dimethylformamide is stirred for 8 hours under refluxing conditions. After cooling the reaction mixture is diluted with 50 parts by volume of dimethylformamide. The reaction product is then suction filtered, washed with 50 parts by volume of dimethylformamide and then with 50 parts by volume of methanol and dried at 90°C. The yellow powder thus obtained colors polyvinyl chloride or polystyrene fast yellow hues.

EXAMPLE 67

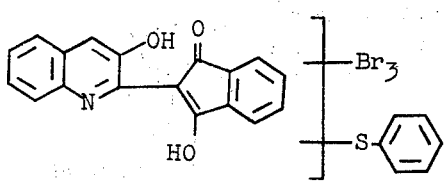

18 parts of compound (B) is stirred with 16.5 parts of thiophenol and 75 parts by volume of N-methylpyrrolidone for 5 hours at 150°C and the whole is then diluted with 500 parts by volume of methanol. The product is suction filtered, washed with methanol and dried. The powder obtained colors polystyrene or polyvinyl chloride fast yellow hues.

EXAMPLE 68

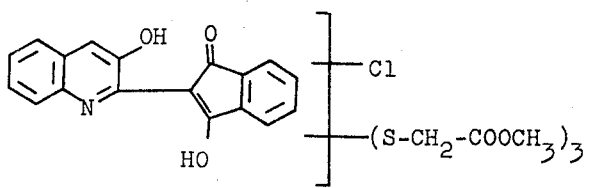

A mixture of 17 parts of compound (A). 21.5 parts of methyl mercaptoacetate, 20 parts of calcium carbonate and 150 parts by volume of N-methylpyrrolidone is stirred for 7 hours at 150°C so that a solution is formed which is freed from insoluble matter by suction filtration through G4 fritted glass. After 1000 parts of methanol has been added the reaction product is deposited and is suction filtered, washed with methanol and then with hot water and dried. A yellow powder is obtained which colors polyester cloth outstandingly fast yellow hues by the HT method and also by the carrier method.

EXAMPLE 69

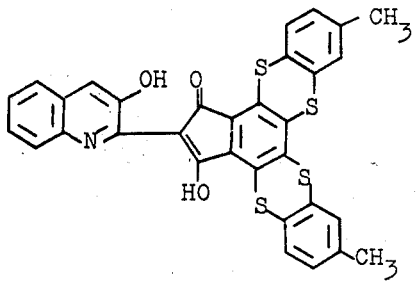

A mixture of 7.5 parts of compound (A), 9 parts of calcium carbonate, 5 parts by volume of toluene-(3,4)-dithiol and 150 parts by volume of N-methylpyrolidone is stirred for 6 hours at 150°C and suction filtered while hot. The residue is washed with hot dimethylformamide and then with alcohol. Finally it is stirred overnight with 500 parts of water and 15 parts of 10N hydrochloric acid, suction filtered, washed with water and dried. The product colors polystyrene fast yellow hues and as a pigment gives yellow surface coatings.

EXAMPLE 70

8.5 parts of ethanediol is added all at once at 150°C to 17 parts of compound (A) in 150 parts by volume of N-methyl-pyrrolidone and the whole is stirred for 8 hours at 190°C under reflux. After cooling to ambient temperature the reaction mixture is poured into 400 parts of alcohol and the precipitated product is suction filtered, washed with alcohol and dried. A yellow powder is obtained which colors polyesters fast yellow hues. The dye probably has the formula:

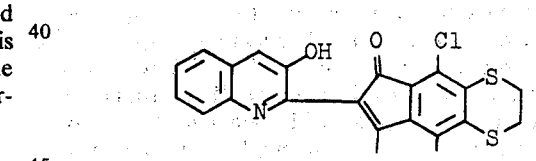

EXAMPLE 71

A mixture of 8.5 parts of the compound (A), 12.5 parts of benzylmercaptan and 75 parts of dimethylformamide is stirred for 6 hours under reflux at 150°C. The reaction product which partly crystallizes upon cooling is substantially precipitated by stirring into 500 parts by volume of methanol, suction filtered and washed with methanol and dried. It colors polystyrene fast yellow hues and has the constitution:

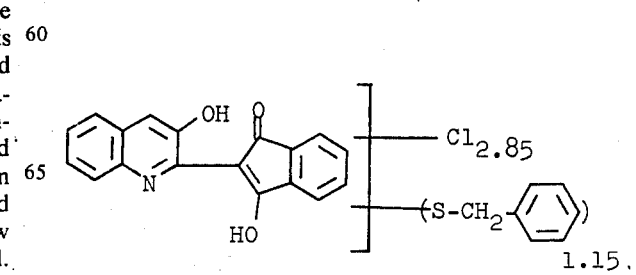

I claim:
1. A dye having the formula:

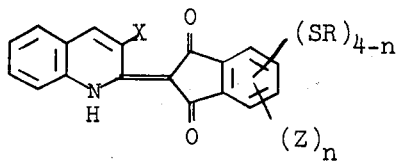

in which

X is hydrogen or hydroxy
Z is chlorine or bromine and
n is zero, 1, 2 or 3 and
$(SR)_{4-n}$ represents $4-n$ groups which may be separate (R denoting hydrogen, alkyl of one to 12 carbon atoms, hydroxyalkyl of two or three carbon atoms, alkoxycarbonyl-methyl or alkoxycarbonylethyl where the alkoxy has one to four carbon atoms, cyclohexyl, benzyl, phenyl, phenyl bearing chloro, methyl, tert-butyl or methoxy as substituents or naphthyl) or any adjacent pair of which may be combined into a group —S—R'—S— where R' represents a 3,4-toluylene- or a dimethylene (whereby one or two six-membered rings each containing 2 sulphur atoms is formed).

2. A dye according to claim 1 and having the formula:

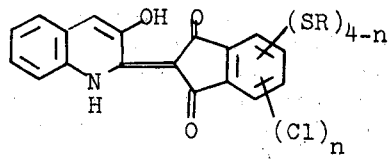

in which $n$ have the meanings specified in claim 1 and R is hydrogen, 2-hydroxyethyl, 2-hydroxypropyl, 2,3-dihydroxypropyl, n-butyl, n-dodecyl, cyclohexyl, benzyl, phenyl, 4-tolyl, 4-methoxyphenyl, 4-chlorophenyl, 2,5-dichlorophenyl, 2,4,5-trichlorophenyl, 2,3,4,5,6-pentachlorophenyl, carboxymethyl, carbomethoxymethyl, 2-carboxyethyl, 2-carbomethoxyethyl or 3,4-toluylene and when $n$ is less than 3 the groups R may be identical or different.

3. A dye as claimed in claim 1 of the formula

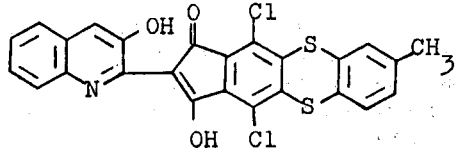

4. A dye as claimed in claim 1 of the formula

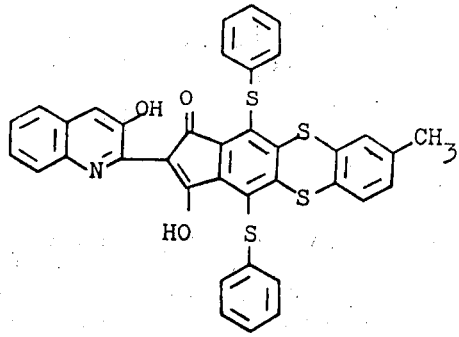

5. A dye as claimed in claim 1 of the formula

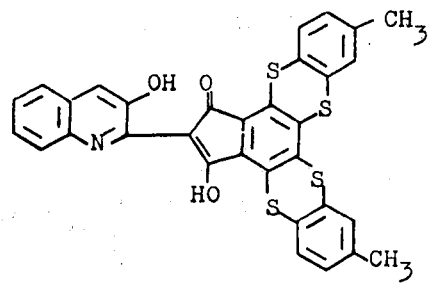

6. A dye as claimed in claim 1 of the formula

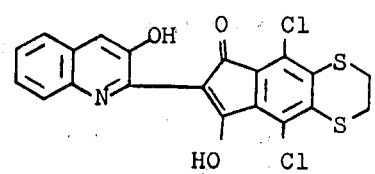

* * * * *